May 1, 1962     S. B. GLASS     3,032,342
HOBBY HORSE
Filed April 19, 1957
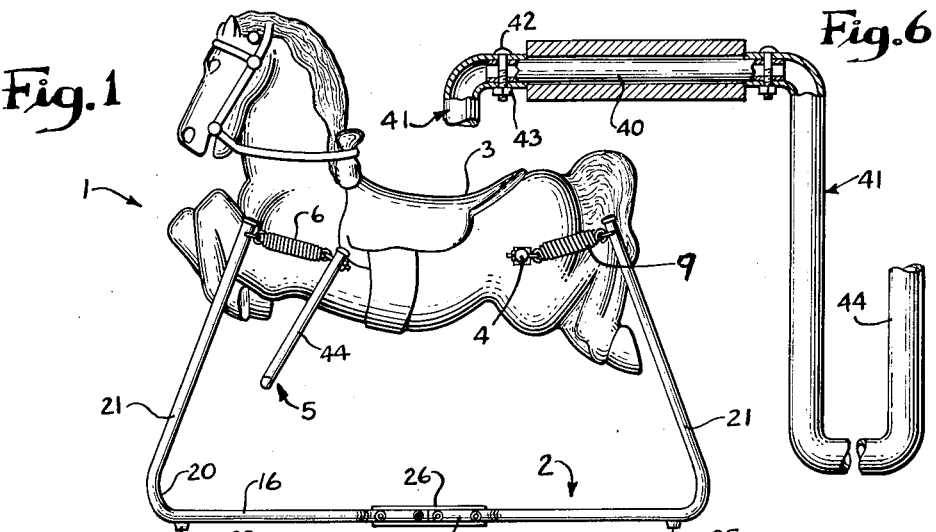
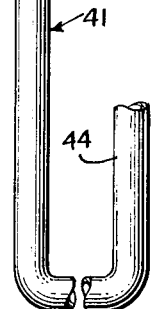
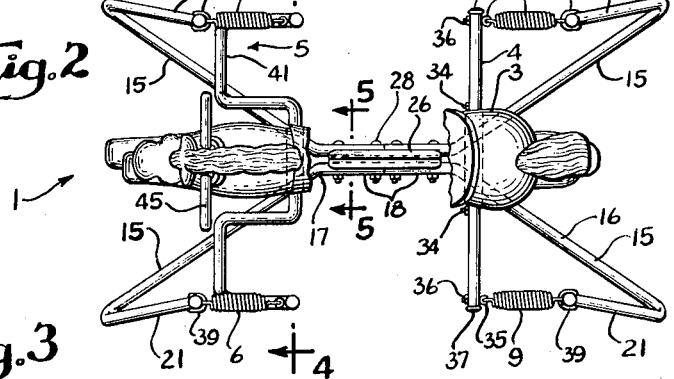
Inventor
SHELDON B. GLASS
Morris Spector
Atty.

United States Patent Office  3,032,342
Patented May 1, 1962

3,032,342
HOBBY HORSE
Sheldon B. Glass, 933 S. Paulina St., Chicago, Ill.
Filed Apr. 19, 1957, Ser. No. 654,000
9 Claims. (Cl. 272—52)

This invention relates to hobby horses and more particularly to horses of the type that are mounted on a base which rests substantially stationary on the floor and wherein the hobby horse is supported from the base by means of springs or the like, so arranged as to permit an up and down movement and a back and forth movement.

The hobby horse of the present invention includes an artificial horse body having a saddle or the like for receiving the young rider, and having a pair of cross bars, forward and aft of the horse at a level preferably below the level of the saddle and so arranged that the cross bars may be connected to supporting springs for supporting the hobby horse in the desired manner.

It is one of the objects of the present invention to construct one of the supporting cross bars of the hobby horse in such a manner that the cross bar can act as stirrups for the child's feet, with a pivoted motion with respect to the horse body.

It is a still further object of the present invention to provide such an arrangement wherein the stirrups are rotatable with respect to the horse body, so that the child can manipulate the stirrups into desired positions for obtaining the desired foot and body leverage for swinging the horse, all while one end of each stirrup is pivoted to the horse body and the opposite end of the stirrup is connected to a support, stationary or movable, from which the horse body is supported.

In accordance with the preferred embodiment of the present invention, the above mentioned results are obtained in the preferred embodiment by making the front support in the form of a cross member, the central part of which extends crosswise through the horse body and is axially rotatable and U-shaped bends are formed in the cross member, one at each side of the center where U-shaped bends constitute the stirrups. In accordance with the preferred embodiment the free ends of the two U-shaped bends are in line with the axis of the center portion of the cross member that extends through the horse body so that axial rotation of the cross member within the horse body does not result in raising or lowering of the horse body.

It is a further object of the present invention to provide a hobby horse base of the type that provides for suspension of a hobby horse from four points located at the corners of a rectangle and wherein the base is formed of four simple metal rods or tubes that are bent to the required shape and which may be compactly arranged for shipment and which may be easily and readily assembled together for use. In this instance each part of the base provides for one of the hobby horse body supports and a pair of supports are spaced from the one another longitudinally of the horse body to provide two upstanding arms which are resilient and are pulled in opposite directions, that is towards one another, by the stresses imposed thereon by the horse body either while supporting a child in a static condition or while the horse is rocking under the action of the young rider.

The attainment of the above and further objects of the present invention will be apparent from the following specification taken into conjunction with the accompanying drawing forming a part thereof.

In the drawing:
FIG. 1 is a side elevational view of a hobby horse embodying the present invention.

FIG. 2 is a top plan view thereof with parts of the horse body broken away to illustrate construction of the base.
FIG. 3 is a front view of the hobby horse of FIG. 1.
FIG. 4 is a transverse sectional view taken along the line 4—4 of FIG. 2.
FIG. 5 is a fragmentary section view taken along line 5—5 of FIG. 2; and
FIG. 6 is a fragmentary sectional view, on an enlarged scale, of a portion of FIG. 4.

Reference may now be had more particularly to the drawing wherein like reference numerals designate like parts thereto.

The hobby horse indicated in general by reference numeral 1 includes a base 2, an artificial horse body 3, a rear cross bar 4, a front cross bar 5, and four springs 6, 7, 8 and 9.

The base 2 consists of four similar parts 15, each formed of tubular spring steel, each of the parts 15 includes a bottom portion 16 that extends diagonally along the ground or floor and at one end has a bend 17 from which extends a straight portion 18. At the opposite end each bottom portion 16 extends along a smooth curve 20 to an upwardly and rearwardly extending arm 21. Each bottom portion 16 has secured thereto a rubber supporting plug 25 adjacent to the curve 20. The four portions 18 extend parallel to one another in a direction lengthwise of the horse body and at median plane thereof and are joined by a connector 26. The connector 26 may comprise two half tubes 29—29 that form two oppositely facing sockets extending lenghtwise of the horse body into each of which opposite the ends 18 of a forward and back base portion 15 extend. Two bolts 28 extend through alined holes in the parts 18 of the two forward supporting members 15 and through corresponding holes in the half tubes 29, and secure the parts together by means of nuts at the ends of the bolts. Two similar bolts extend through the parts 18 of the two rear supports 15 and through the half tubes 29 and secure the parts together also by means of nuts.

The cross member 4 extends through and supports the rear of the horse body, and means is provided for preventing longitudinal shifting of the cross bar 4. In its simplest form this means may comprise a pair of screws 34 extending through the cross bar on opposite sides of the horse body. Each end of the cross bar 4 has a pair of alined openings through which an eye bolt 35 is extended, the eye bolt being secured in place by a nut 36. Suitable plugs 37 close the opposite ends of the tubular cross bar 4. Each arm 21 has adjacent the upper end thereof a pair of alined openings through each of which a metal loop or ring is extended. A plug 40' closes the upper open end of each arm 21. The springs 8 and 9 extend between the eyes 35 that are secured to the rear cross bar 4 and the loops 39 that are secured one to the upper end of each arm 21.

The front cross bar 5 is a fabricated structure constituting in effect a crank shaft and includes a tube 40 that extends through and supports the front part of the horse body and projects transversely from the sides thereof. At each end of the tube 40 there is telescoped the end of a tubular stirrup member 41 that has been bent to form a crank which is of a U-shape to constitute a stirrup. Each member 41 is secured to the tube 40 by a bolt 42 and a nut 43. The upper end of the outer side 44 of each stirrup member 41 terminates in line with the longitudinal axis of the tube 40 and is connected to the spring 7 or the spring 6 as the case may be, by means of an eye bolt the same as the cross bar 4 is connected to its springs. The connection between the eye bolt and the side 44 of the stirrup is in line with the longitudinal axis of the tube 40.

The structure above described rests on the four rubber grommets 25 so that the tubular portion of the supporting frame is entirely above the floor, although the half tubes 29 may also rest on the floor, or they may be slightly above the floor level.

The springs 6–9 are of such size and stiffness that even when the horse is burdened by a rider the slope of the springs 6–9 as seen in side view is slight. The longitudinal axes of the two right hand side springs lie in substantially the same vertical plane and the longitudinal axes of the left hand side springs lie in substantially the same vertical plane. Both ends of each spring are substantially spaced from the longitudinal vertical center plane of the horse body thus affording considerable stability to the same during all types of rocking and side action thereon by the child. When the child is sitting on the horse with its feet on the stirrups, the cross bar 5 is free to turn axially in the horse body under the pressure exerted against the stirrups by the child so that the child may obtain different degrees of leverage upon the horse body and distribute his weight as desired. To facilitate even action the horse head has a handle support 45 that comprises a dowel extending through and rigidly held in the head of the horse body.

In compliance with the requirements of the patent statutes I have herein shown and described a preferred embodiment of the present invention.

What is considered new and sought to be secured by Letters Patent is:

1. A hobby horse comprising an artificial horse body and means for supporting the same including a cross member extending transversely of the horse body below and forward of the back of the horse body, the horse body and the cross member being secured together so that the cross member constitutes a support for the forepart of the horse body, the cross member being pivoted for turning with respect to the horse body about an axis that extends transversely of the horse body, and means forming a pivotal supporting connection with the cross member at opposite sides of the horse body at the axis of rotation of the cross member with respect to the horse body for supporting the horse body, said cross member having downwardly extending stirrups formed therein at opposite sides of the horse body between the horse body and said last named means.

2. A hobby horse comprising an artificial horse body and means for supporting the same including a cross member extending transversely of the horse body below and forward of the back of the horse body, the horse body and the cross member being secured together so that the cross member constitutes a support for the forepart of the horse body, the cross member being pivoted for turning with respect to the horse body about an axis that extends transversely of the horse body, said cross member having on each side of the horse body a series of bends forming on each side of the horse body, a downwardly extending U-shape that is open at the top and constitutes a stirrup at its bottom, and means forming supports for the cross member and thereby supporting the forepart of the horse.

3. A hobby horse comprising an articficial horse body and means for supporting the same including a cross member extending transversely of the horse body below and forward of the back of the horse body, the horse body and the cross member being secured together so that the cross member constitutes a support for the forepart of the horse body, the cross member being pivoted for turning with respect to the horse body about an axis that extends transversely of the horse body, said cross member having on each side of the horse body a series of bends forming a downwardly extending U-shape that is open at the top and constitutes a stirrup at its bottom, and means forming supports for the cross bar at the side of each U-shaped bend that is remote from the horse body.

4. A hobby horse comprising an artificial horse body and means for supporting the same including a cross member extending transversely of the horse body below and forward of the back of the horse body, the horse body and the cross member being secured together so that the cross member constitutes a support for the forepart of the horse body, the cross member being pivoted for turning with respect to the horse body about an axis that extends transversely of the horse body, said cross member having on each side of the horse body a series of bends forming a downwardly extending U-shape that is open at the top and constitutes a stirrup at its bottom, and means forming supports for the cross member at the side of each U-shaped bend that is remote from the horse body and at a place thereon that is substantially in line with the axis of rotation of the member with respect to the horse body.

5. A spring suspended hobby horse including an artificial horse body, a support providing four points of support for the body located at four corners of a rectangular, front and rear supporting members for the horse body extending transversely thereof on opposite sides of the horse body, supporting springs connecting the extended parts of each of said members with the respective four points, the front member being rotatable axially in supporting relationship to said horse body and having on each side of the horse body a crank arm between the horse body and the adjacent spring, each said crank arm constituting a stirrup for the hobby horse.

6. A spring suspended hobby horse including an artificial horse body, a support providing four points of support for the body located at four corners of a rectangle, front and rear supporting members for the horse body extending transversely thereof on opposite sides of the horse body, supporting springs connecting the extended parts of each of said members with the respective four points, the front member being rotatable axially in supporting relationship to said horse body and having on each side of the horse body a crank arm between the horse body and the adjacent spring, each said crank arm constituting a stirrup for the hobby horse, said springs extending from said members at a smaller angle to the horizontal than to the vertical when the hobby horse is burdened by a rider.

7. A hobby horse including an artificial horse body, a support providing four points of support for the body located at four corners of a rectangle, front and rear supporting members for the horse body extending transversely thereof on opposite sides of the horse body, supporting means pivotally connecting the extended parts of each of said members with the respective four points, the front member being rotatable axially in supporting relationship to said horse body and having on each side of the horse body a crank arm between the horse body and the adjacent supporting means, each said crank arm constituting a stirrup for the hobby horse.

8. A hobby horse comprising an artificial horse body, a support providing four points of support for the body and being located at four corners of a rectangle, front and rear supporting members for the horse body extending transversely thereof on opposite sides of the horse body, and supporting means connecting the extended parts of each of said members with the respective four points, the front member being rotatable axially and supporting the horse body by means permitting rotation of the front member about an axis of rotation extending transversely through said horse body and having on each side of the horse body a crank arm between the horse body and the adjacent supporting means, each said crank arm constituting a stirrup for the hobby horse, the points of connection between the front member and supporting means lying substantially on said axis of rotation of said front member with respect to the horse body.

9. A hobby horse including an artificial horse body, a support providing four points of support for the body located at four corners of a rectangle, front and rear supporting members for the horse body extending transversely thereof on opposite sides of the horse body, supporting means pivotally connecting the extended parts of each of said members with the respective four points, the front member being rotatable axially in supporting relationship to said horse body and having on each side of the horse body a crank arm between the horse body and the adjacent supporting means, each of said crank arm having a foot receiving portion extending transversely of the horse body and spaced from the axis of rotation of the member and constituting a stirrup for the hobby horse.

References Cited in the file of this patent

UNITED STATES PATENTS

| | | |
|---|---|---|
| 459,282 | Gollon | Sept. 8, 1891 |
| 1,980,076 | Morgan et al. | Nov. 6, 1934 |
| 2,437,015 | Baltz | Mar. 2, 1948 |
| 2,551,632 | Pichler | May 8, 1951 |

UNITED STATES PATENT OFFICE
CERTIFICATE OF CORRECTION

Patent No. 3,032,342

May 1, 1962

Sheldon B. Glass

It is hereby certified that error appears in the above numbered patent requiring correction and that the said Letters Patent should read as corrected below.

Column 1, line 58, strike out "the"; column 3, line 53, after "forming" insert a comma; column 4, line 15, for "rectangular" read -- rectangle --.

Signed and sealed this 14th day of August 1962.

(SEAL)
Attest:

ERNEST W. SWIDER
Attesting Officer

DAVID L. LADD
Commissioner of Patents